United States Patent [19]

van der Gracht et al.

[11] Patent Number: 4,835,517
[45] Date of Patent: May 30, 1989

[54] MODEM FOR PSEUDO NOISE COMMUNICATION ON A.C. LINES

[75] Inventors: Peter K. van der Gracht, Burnaby; Robert W. Donaldson, Vancouver, both of Canada

[73] Assignee: The University of British Columbia, Vancouver, Canada

[21] Appl. No.: 622,636

[22] Filed: Jun. 20, 1984

[30] Foreign Application Priority Data

Jan. 26, 1984 [CA] Canada .................................. 446149

[51] Int. Cl.$^4$ ..................... H04M 11/04; H04B 15/00
[52] U.S. Cl. ............................ 340/310 A; 340/310 R; 375/1
[58] Field of Search ............ 340/825.5, 310 A, 310 R; 375/115, 8, 11, 41

[56] References Cited

U.S. PATENT DOCUMENTS

| | | | |
|---|---|---|---|
| 4,328,482 | 5/1984 | Belcher et al. | 340/310 A |
| 4,367,455 | 1/1983 | Fried | 340/310 A |
| 4,377,804 | 3/1983 | Suzuki | 340/310 A |
| 4,382,297 | 5/1983 | Farrow | 375/41 |
| 4,400,688 | 8/1983 | Johnston et al. | 340/310 A |
| 4,583,073 | 4/1986 | Stolowicki | 340/310 A |
| 4,599,732 | 7/1986 | LeFever | 375/115 |
| 4,641,322 | 2/1987 | Hasegawa | 340/310 A |

OTHER PUBLICATIONS

H. Ochsner, "Data Transmission on Low Voltage Power Distribution Lines Using Spread Spectrum Techniques", Proc. Canadian Commun. and Power Conf. (IEEE), Montreal, Quebec, Oct. 15–17, 1980, pp. 236–239.
R. C. Dixon, *Spread Spectrum Systems*, Wiley & Sons, New York (1976), Chapt. 6.
S. E. Sarns, "Build This Home Control Computer", Radio–Electronics, pp. 64–69; 74; 110, May 1984.
L. Curran, "How to Turn AC Lines into Phone Lines", *Electronics*, Jul. 20, 1978, p. 155.
"Electronics Newsletter", *Electronics*, Jun. 22, 1978, p. 34.

Primary Examiner—Douglas W. Olms
Assistant Examiner—Curtis Kuntz
Attorney, Agent, or Firm—Christie, Parker & Hale

[57] ABSTRACT

A modem which may operate as a transmitter or receiver, is provided for use on a line carrying an A.C. signal. The modem comprises a pseudorandom code generator which produces a pseudorandom code signal of a frequency an integral multiple of the A.C. signal frequency. Synchronization means synchronizes the code signal with the A.C. signal. Preferably a coherent system is provided in which a data signal involved has a bit rate an integral multiple of the A.C. signal frequency and in which a carrier generator is additionally provided to produce a carrier signal of a frequency an integral multiple of the A.C. signal frequency. In such case, the synchronization means also synchronizes the data bit and carrier signals with the A.C. signal.

23 Claims, 9 Drawing Sheets

MODEM FOR PSEUDO NOISE COMMUNICATION ON A.C. LINES

FIELD OF THE INVENTION

This invention relates to a modem for use on a line carrying an A.C. signal, particularly an electric power line.

DESCRIPTION OF PRIOR ART

Communication networks, particularly localized communication networks, are enjoying an ever increasing demand for functions such as office automation, security monitoring, environmental management of buildings, and computer communications. Transmission of data signals (including those from keyboards or computers, or digitization processes) or information signals (including data signals, data modulated signals or analog signals such as speech, music or video) is of interest. It is desirable to set up such communication networks utilizing existing electric power distribution circuits since such are widely and readily available, thereby minimizing installation costs of specialized communication or telephone lines. In addition, existing power distribution circuits are easily accessed via standard wall plugs. As well, electric power utility companies require communication facilities, and often use power transmission or distribution circuits to carry information signals.

Particular disadvantages though in using existing power transmission and distribution circuits (which may be broadly referred to as electric power lines) for communications, include limited communication bandwidth, relatively high noise levels, and varying levels of impedance, noise and attenuation. A particular method for enabling such communications, utilizes pseudonoise (PN) multiple access signalling to accomplish communication. The advantages of PN signalling include insensitivity to narrowband signal interference, as well as multiplexing capability, addressing capability, limited immunity to eavesdropping, and easily implemented error rate versus data rate tradeoffs. PN signalling normally involves modulation of a carrier by a data bitstream and a high rate pseudo random bit stream. The foregoing may be accomplished by first multiplying the data bit stream by the pseudo random bit stream or code, followed by modulation of the carrier. At the receiver, after conventional demodulation by means of the code signal and carrier signal, the data signal can be recovered. In some applications a separate carrier is not used and the pseudo random code serves as the carrier.

A primary disadvantage with existing PN systems is the difficulty in synchronizing the code signal at the receiver with that at the transmitter. Of course, a failure to accomplish the foregoing synchronization leads to unacceptably high error rates or output noise levels if the code signals at the transmitter and receiver are out of alignment. Various techniques have been developed to acquire and maintain code synchronization for data signal transmission applications. Such techniques include "sliding" a replica of the transmitter code generated at the receiver by the received signal, until relatively high cross correlation is obtained. An alternative procedure is to first transmit a short code to acquire synchronization, and then the long code may be used to transmit the data (a long code being preferred to provide a flat wideband transmitted spectrum). Other methods involve using special codes at the transmitter end receiver with peculiar cross-correlation properties which speed synchronization. Difficulties with the foregoing methods particularly include the time delay required for the receiver to acquire synchronization, as well as relatively complex circuitry to facilitate such synchronization. Still other techniques utilize matched filter receivers or sequence estimators, thereby producing quicker synchronization, however such techniques are relatively expensive to implement. Some specialized applications such as satellite communications however do make use of a transmitted universal timing signal to minimize search processes, in which case all transceivers would operate off the same timing signal with only propagation delays determining the inherent phase of the received signal.

It is desirable then to have a PN transmitter and receiver wherein the respective code signals can be synchronized by a simple, relatively economical means, and which means does not produce excessive synchronization delays but will still maintain relatively low error rates.

SUMMARY OF THE INVENTION

A modem for use on a line carrying an A.C. signal is provided, an "A.C. signal" being used in this application to describe any signal with any characteristic repeating at regular intervals. Such a modem has a coupling circuit means for coupling the modem to the line, and a pseudo random code generator connected to the coupling circuit means. The foregoing code generator produces a pseudo random code signal of a frequency an integral multiple of the A.C. signal frequency. That is, the code signal repeats itself n times during one cycle of the A.C. signal, where n is any positive integer, including one. A synchronization means is also provided for synchronizing the code signal with the A.C. signal. The foregoing construction comprises the basic elements of either the transmitter or receiver portion of such a modem.

The modem is typically used with a data signal having a bit rate an integral multiple of the A.C. signal frequency. The data signal referred to of course, is either the input data signal in the case of the transmitter portion of such a modem, or the data signal received on the line in the case of the receiver portion thereof (which data signal in such case will of course be contained within a signal received on the A.C. signal carrying line, which signal is a result of a carrier signal modulated by the data signal and the code signal). In such case, the synchronization means synchronizes both the data bit and code signals with the A.C. signal.

Alternatively or as well, the modem may transmit and receive other information signals, including analog signals not requiring synchronization.

Preferably, the modem also includes a carrier generator which produces a carrier signal of a frequency which is an integral multiple of the A.C. signal frequency, that is n times the A.C. signal frequency, where n is any integer greater than or equal to one. The synchronization means in such case would also preferably synchronize the carrier signal with the A.C. signal.

In one particular embodiment, the modem is constructed for use on an electric power line carrying an A.C. signal in the form of sinusoidal A.C. power. The coupling circuit means in such embodiment, isolates the code generator and the synchronization means from the A.C. signal.

The synchronization means used preferably synchronizes the signals on their zero crossings, and readily synchronizes them on single zero crossings. Furthermore, the code generator usefully produces a digital code signal which might typically be a bi-level code signal, and the carrier generator usefully produces a square wave carrier signal.

Preferably, the code generator produces a code signal of a frequency 6n times that of the A.C. signal frequency, where n is any positive integer. Other embodiments of the pseudonoise modem described include the provision of a zero crossing averaging circuit which averages zero crossings over a plurality of cycles of the A.C. signal. In such case, the synchronization means is arranged to synchronize the zero crossings of the code and data signals with the average zero crossings of the A.C. signal from the zero crossings averaging circuit.

When the modem is used as a transmitter, it also additionally comprises a signal spreader and modulator circuit which modulates the carrier signal with the code and information signals prior to transmission on the line. When the modem is used as a receiver, it additionally comprises a despreader and demodulator circuit, and where the information signal is a data signal, also a data detector which detects the demodulated signal over each data bit period.

A method of transmitting a data signal or other information signal by means of the modem described, is also disclosed, as well as the method for using such a modem to receive such a data signal or other information signal.

DETAILED DESCRIPTION OF EMBODIMENTS OF THE INVENTION

Figure 1:
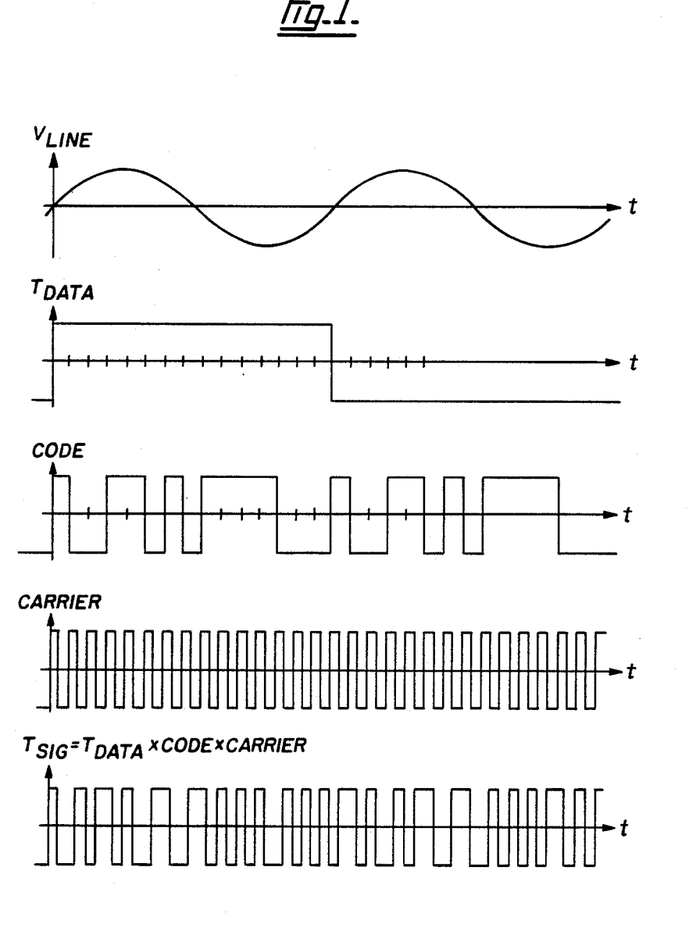
FIG. 1 shows the wave forms for a simple coherent system wherein the data, code, and carrier signals are synchronized with the zero crossings of the A.C. line.

The basic concept of the particular modem to be described, is to synchronize the code with zero crossings of an A.C. signal on a line carrying such a signal, such as a power line which in North America would typically carry an A.C. signal in the form of sinusoidal 60 Hz power. Preferably the carrier and data bits are also synchronized with the A.C. signal zero crossings. In such case, the data signal ($T_{DATA}$) can be "spread" on the code signal in the case of the digital signals shown in FIG. 1, by multiplying the two signals by use of exclusive NOR circuitry. The product of the foregoing can then be multiplied by the carrier signal with the resultant signal ($T_{SIG}$) shown at the bottom of FIG. 1, which may then be transmitted through the line. The foregoing process can of course be viewed simply as a modulation of the carrier signal by the code and data signals. The data bit rate shown in FIG. 1 is one bit per A.C. signal cycle, with the code being 15 bits long and repeating once in every A.C. cycle only (i.e. having a frequency equal to that of the A.C. signal). The carrier signal shown in FIG. 1 is a square wave of frequency equal to 900 Hz.

Figure 2:
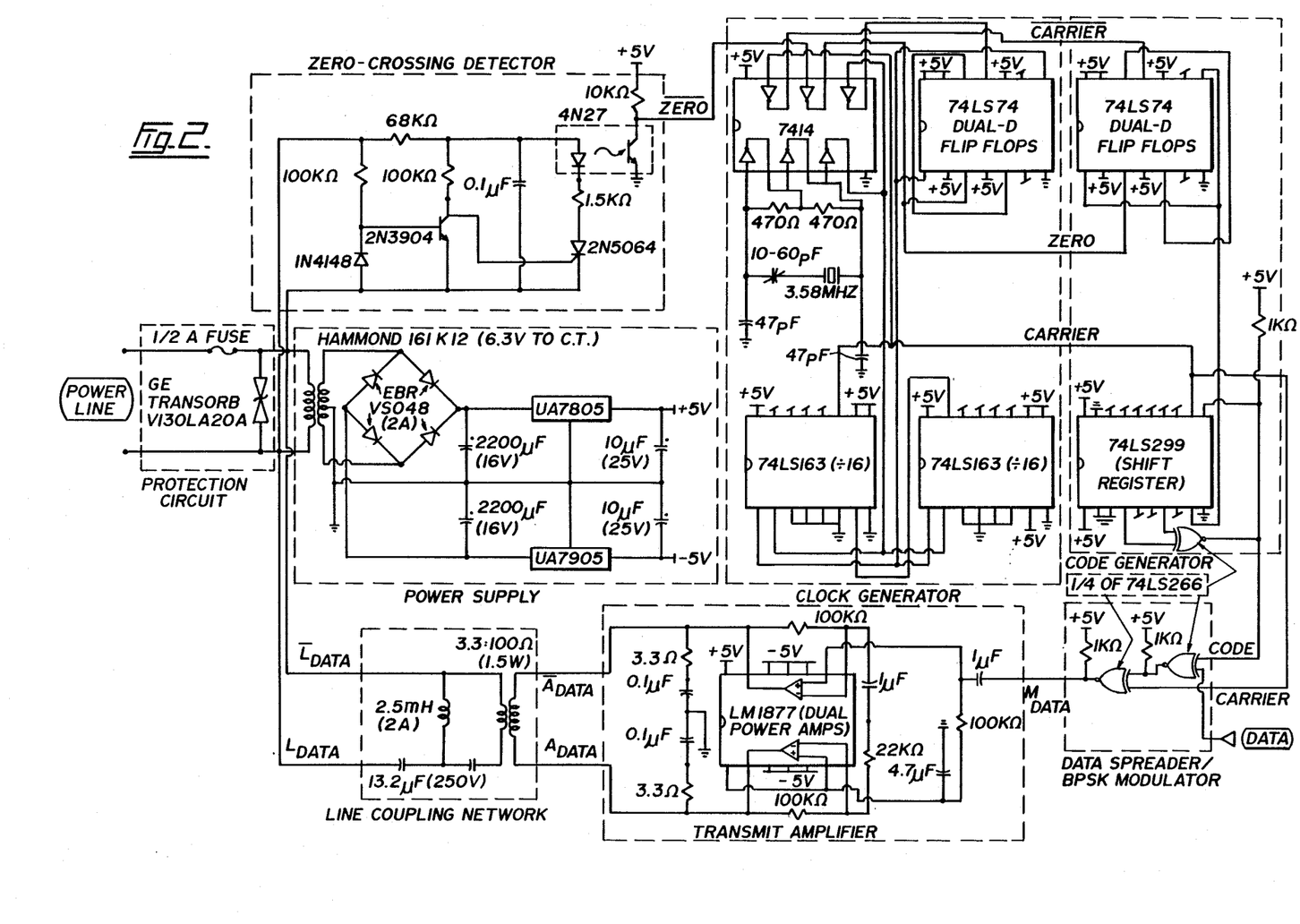
FIG. 2 is a schematic of a transmitter of a modem of the present invention.
Figure 4A:
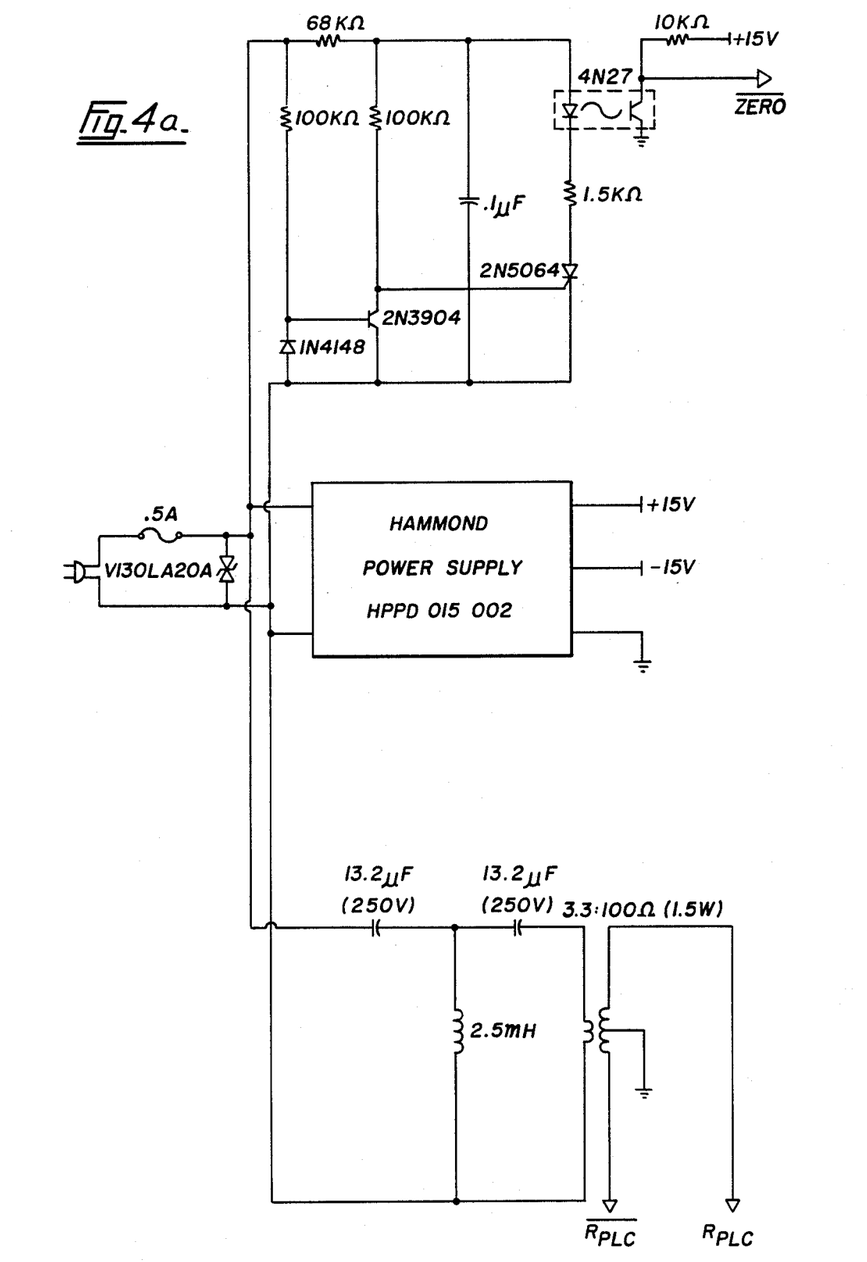
FIGS. 4(a) and 4(b) represents an alternate circuit schematic for common components in a transmitter and receiver of a modem of the present invention.
Figure 4B:
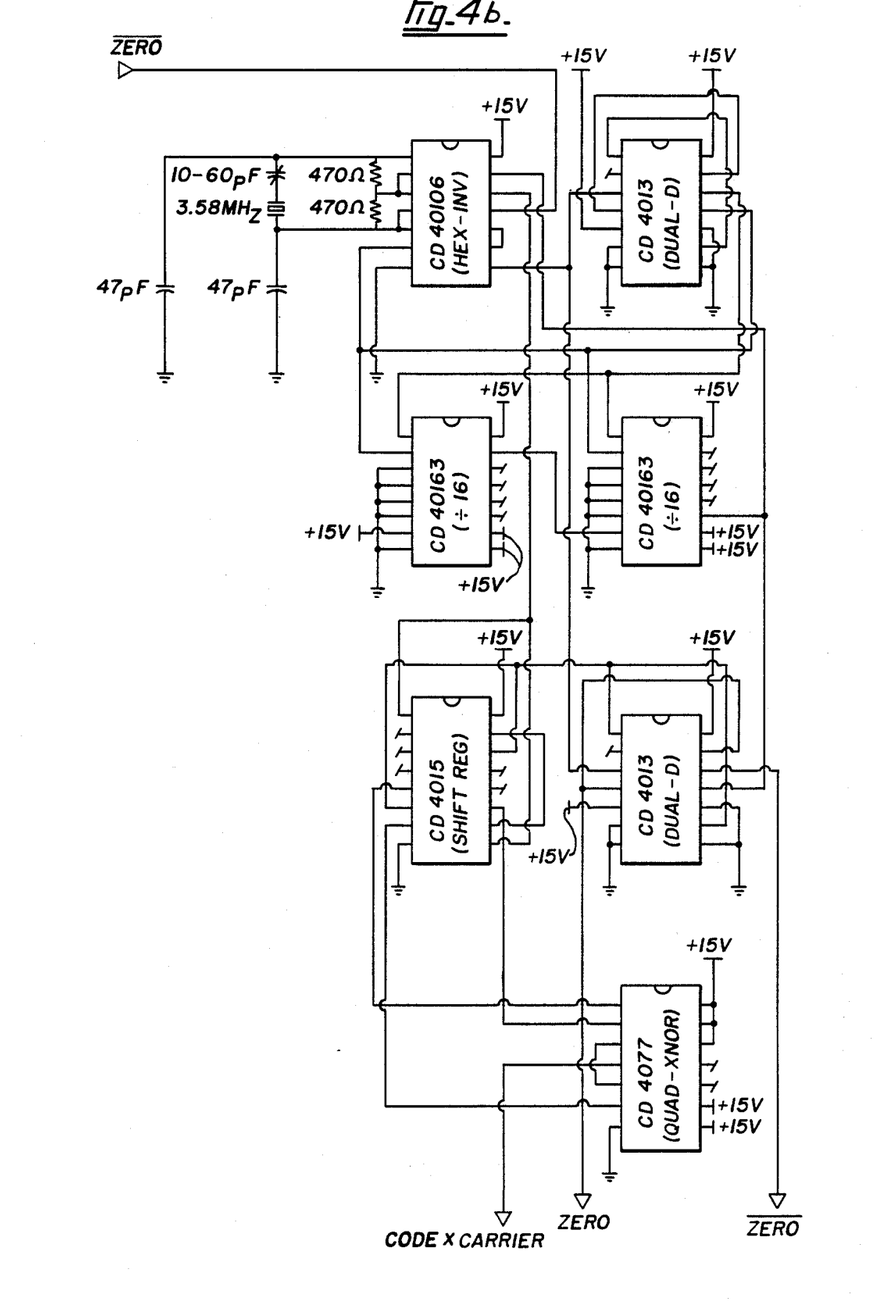

Referring now to FIG. 2, a schematic of a particular transmitter modem of the present invention is shown. The circuits shown in both FIGS. 2 and 4 are constructed for use on a 110 Volt, 60 Hz (sinusoidal) electric power line.

The entire modem is protected against high voltage transients by a fuse and transorb disposed in the protection circuit. The power supply provides ±5 volts, d.c., regulated by UA 7805 , and UA 7905, + and − fixed voltage regulators respectively. A zero-crossing detector generates a negative pulse ($\overline{ZERO}$) whose leading edge coincides with every positive-going 60-Hz zero-crossing. The $\overline{ZERO}$ pulse or its complement is used to synchronize both the carrier and code sequence. A clock generator is driven by a 3.58 MHz color-burst crystal with output being a square-wave signal which is synchronized to the 60 Hz line frequency by the $\overline{ZERO}$ pulse. Division of the 3.58 MHz crystal frequency by 256 yields a carrier frequency of approximately 14 KHz.

A code generator produces a pseudo random m-sequence and is restarted by every $\overline{ZERO}$ pulse. The two flip-flops in the 74LS74 chip format the $\overline{ZERO}$ pulse for use by the 8-bit shift register (74LS299). Exclusive-NOR processing of shift-register outputs 1 and 7 provides a feedback signal to the shift register input. A 127-bit long pseudorandom m-sequence is thereby generated. Since every 60-Hz cycle contains 233 carrier cycles the code repeats almost twice with each zero-crossing interval.

A data spreader uses an exclusive-NOR gate to multiply the low-speed data signal by the PN code. The data signal is provided at a bit rate an integral multiple of the A.C. signal frequency and synchronized with the zero crossings thereof by means of the ZERO signal or its complement utilizing appropriate circuitry. Because the carrier signal is a square wave a BPSK modulator is also easily implemented by an exclusive-NOR gate which generates the modulated data signal $M_{DATA}$.

A transmit amplifier accepts $M_{DATA}$ and delivers a differentially amplified version $A_{DATA}$ to a line coupling network. This network consists of an audio transformer for isolation and impedance matching, as well as a third-order Butterworth highpass filter which blocks the 60 Hz power signal while passing the high-frequency modulated carrier $L_{DATA}$ to the power distribution network. The low output impedance of the transmitter amplifier is reduced further by the matching transformer to below 1Ω on the transformer's line side to obtain high SNR. The highpass filter's nominal cutoff frequency is 6 KHz with an attenuation in excess of 100 dB at 60 Hz. It has been found experimentally that there is acceptable distortion of the transmitted signal across the line coupling network.

Figure 3:
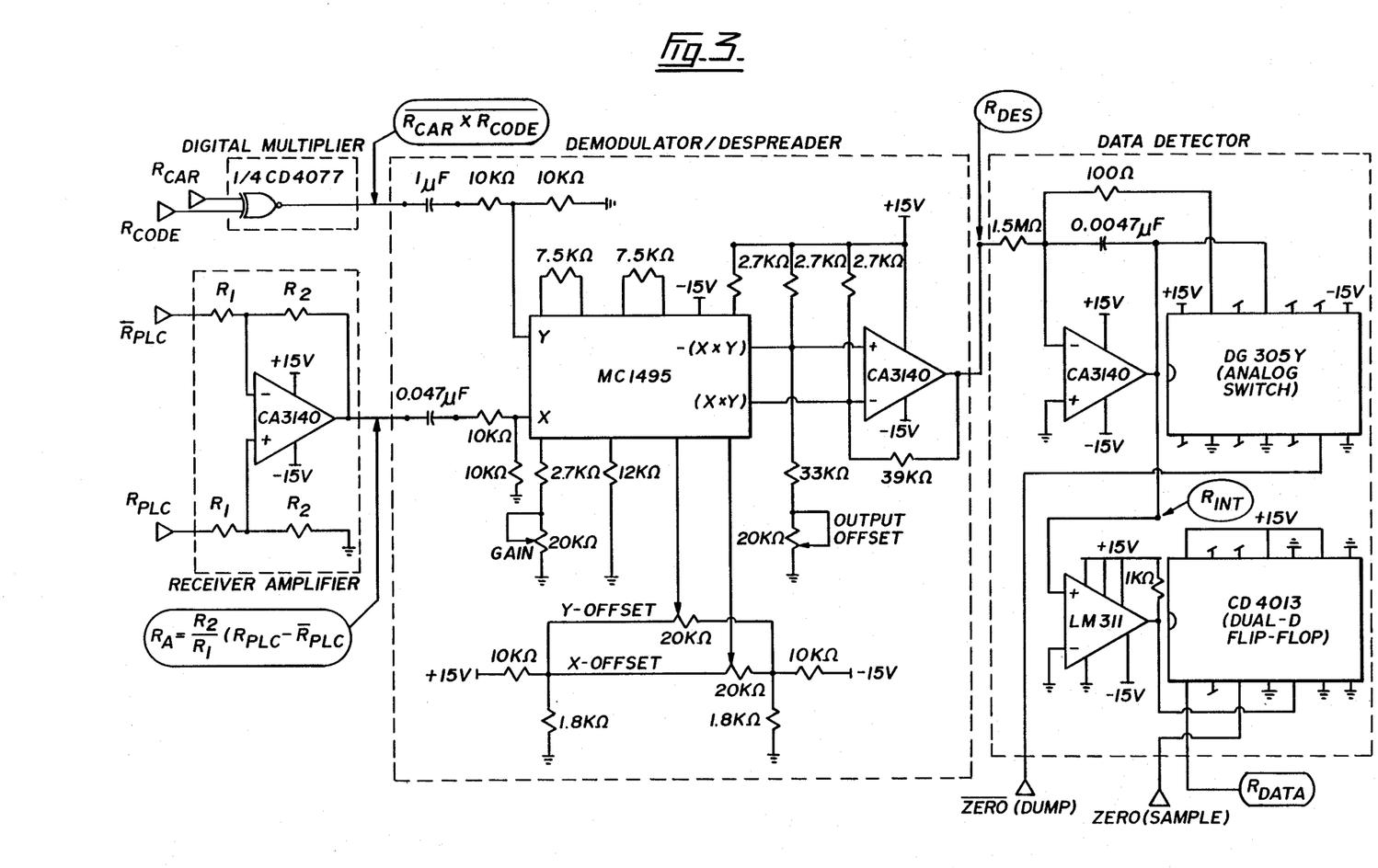
FIG. 3 is a partial receiver schematic of a modem of the present invention.

Referring now to FIG. 3, a part of a schematic of a modem of the present invention, and constructed as a receiver is shown. The circuitry for the protection network, power supply, line coupling network, zero-crossing detector, clock generator and code generator is similar to that of the transmitter, except that the operating voltages are ±15V as required by the data despreader.

The receiver's line coupling network passes the received signal to the differential amplifier as $R_{PLC}$. In the absence of noise, interference and distortion, $R_{PLC} \simeq L_{DATA}$. The receiver amplifier differentially boosts $R_{PLC}$ before it enters the demodulator/despreader as $R_A$. Signal $R_A$ is demodulated by multiplying it by the (synchronized) code and carrier signals $R_{CODE}$ and $R_{CAR}$. The associativity of the multiplication process enables the product $R_{CODE} \times R_{CAR}$ to be obtained using a digital multiplier. Analog circuitry then multiplies the resulting product and $R_A$ to yield the despread signal $R_{DES}$.

The data detector is an integrate-and-dump circuit which integrates $R_{DES}$ over one bit period, applies the resulting signal ($R_{INT}$) to a comparator and samples the output at the end of the bit period. The resulting output is the received data signal $R_{DATA}$.

FIG. 4 shows an alternative circuit of a modem of the present invention, which circuit represents parts which can be used in common with the non-common components of a transmitter and receiver. For a transmitter one need only add an appropriate data input to the digital multiplier CD 4077 (containing four exclusive-NOR circuits), as well as a transmit amplifier. In the case of a receiver, only a receiver amplifier, demodulator/despreader, and data detector need be added.

It will be noted that in the receiver and transmitter described above, the combination of the line coupling network and the zero crossing detector, acts as a coupling circuit means for coupling the modem containing such to the power line. At the same time, the coupling circuit means isolates other components from the A.C. signal.

Figure 5:
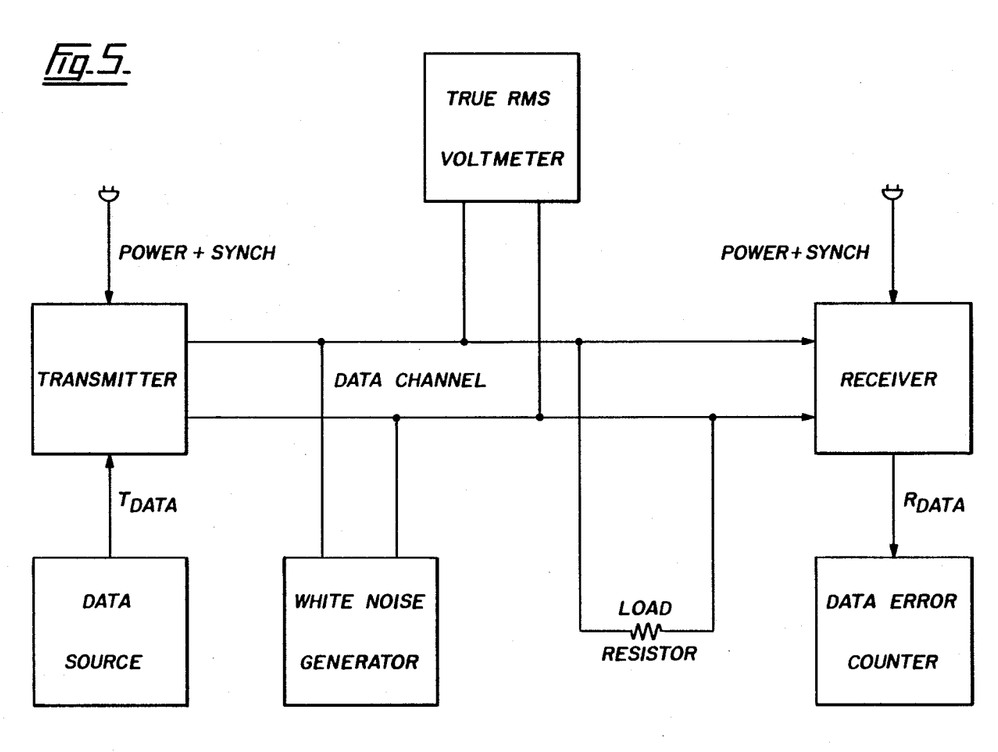
FIG. 5 is a circuit block diagram for testing a transmitter and receiver each of a modem of the present invention.

The receiver and transmitter of FIGS. 2 and 3 were tested in three separate environments as described below. FIG. 5 shows a block diagram for the test circuit, with the only difference in the test circuit in the three environments described below, being that in the case of tests B and C, a 60 Hz power distribution line was used to interconnect the transmitter and receiver and replaced the direct wire connection present in case A. In each case, a constant resistive load and white noise generator were placed across the channel and a true RMS volt meter was used to measure both signal and noise levels. A 60 Hz (sinusoidal) power line signal was used for synchronization, which signal in the cases of B and C was provided from the actual power distribution line over which the signal from the transmitter was transmitted. A data source was used which generated a pseudorandom binary data stream at 60 bits/second and a data error counter was used to estimate the bit-error probability, p.

A. White Noise, Constant Impedance, Constant Attenuation Channel

Figure 6:
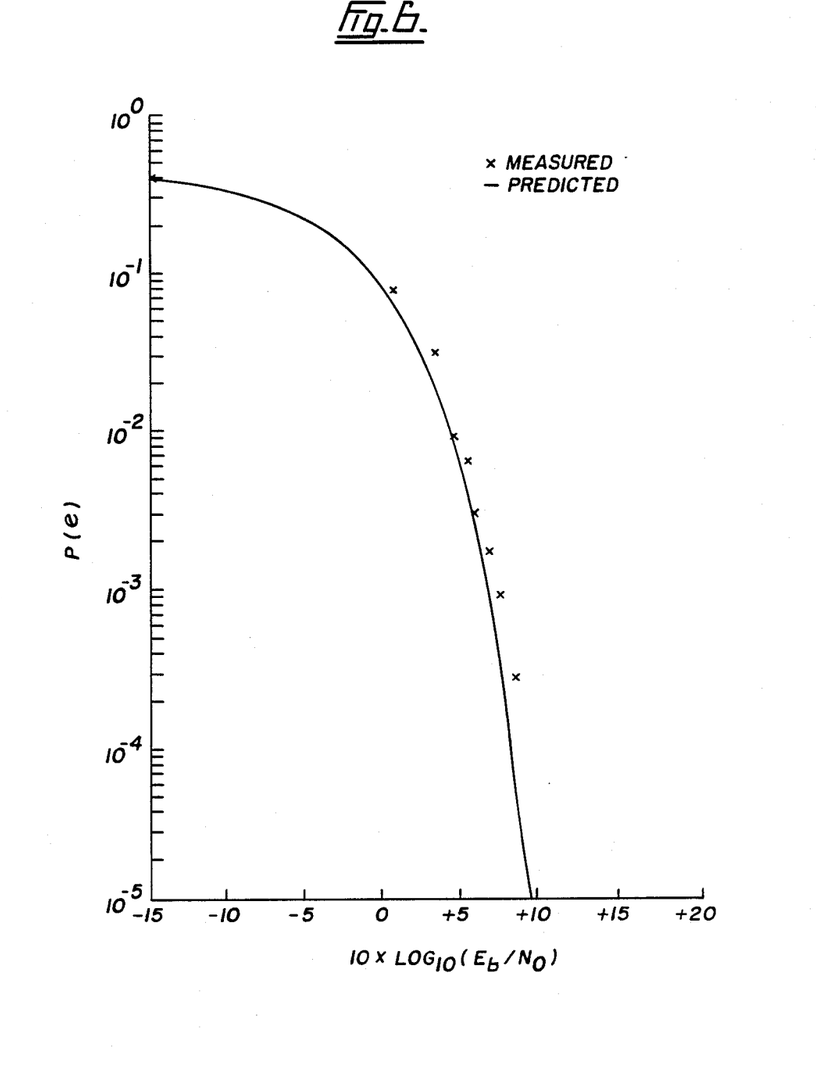
FIG. 6 is a graph of bit error probability as a function of energy ($E_b$) per data bit and noise power spectral density ($N_o$), when a transmitter and receiver of a modem of the present invention is tested in accordance with FIG. 5 with a direct wire connection between the two.

To ensure a reasonably accurate estimate of p in this particular use, transmission at any given signal and noise level continued until approximately 100 errors were observed. FIG. 6 shows measured values of p vs. $E_b/N_O$, as well as approximate values calculated with M=1 in the equations below. The close correspondence of the predicted and measured values indicates the proper working of the modem including its synchronization circuitry.

The bit error probability of a pseudonoise system may be calculated as outlined in the following equations for which the following symbols are defined:

P—received pseudonoise signal power
$N_O/2$—received noise power spectral density
M—number of active transmitters
$R_B$—data bit transmission rate
$R_C$—channel bit rate (chip rate) 'W—base band "bandwidth" of transmitted pseudonoise signal
$N_t/2$ power spectral density of received noise plus interference
G—spread spectrum processing gain ($G = R_C/R_B$)
SNR—output signal-to-noise ratio
$SNR_O$—output signal-to-noise ratio for M=1
p—bit error probability of decoded data The SNR is defined as the decoded energy per data bit in the absence of noise and interference, relative to the output power from noise and interference. For coherent reception and matched filter detection of the received signal, assuming perfect synchronization of the received signal:

$$SNR = 2P/R_B N_t \tag{1}$$

In (1) the received noise plus interference power is assumed white over the signal bandwidth. This latter assumption is reasonable for $G \gtrsim 10$. The bandwidth W of the transmitted signal is proportional to $R_C$, thus:

$$W = \alpha R_C \tag{2}$$

where $\alpha$ is the proportionality constant. For M-1 interfering signals, all at received power P, the interference power spectral density is $(M-1)P/2W$ and:

$$N_t = N_O + (M-1)P/W \tag{3}$$

When $R_B = R_C$, $N_O = 0$ and $M=2$ the sole contribution to $N_t$ is from one (synchronized) interfering signal. In this case $N_t = P/W$ and $SNR = 1$. From (1), (2) and (3) it follows that $\alpha = \frac{1}{2}$ and $$SNR = SNR_O / \left[ 1 + \frac{(M-1)}{G} SNR_O \right] \tag{4}$$

For values of $G \gtrsim 10$ it is reasonable to approximate the noise plus interference as Gaussian in which case:

$$p \simeq Q(\sqrt{SNR}) \tag{5}$$

where $$Q(x) = \frac{1}{\sqrt{2\pi}} \int_x^\infty \exp\left(\frac{-y^2}{2}\right) dy \tag{6}$$

The noise power spectral density $N_O/2$ in (3) was determined from $$N_O = (n_{RMS})^2 / W_R \tag{7}$$

where $n_{RMS}$ is the measured RMS noise power and $W_R$ is the receiver's noise bandwidth after the signal has passed through the line coupling network. The observed value for $W_R$ in the receiver described was 300 kHz. The energy $E_b$ per data bit was determined from $$E_b = (s_{RMS})^2 / R_B \qquad (8)$$

where $s_{RMS}$ is the RMS signal power and bit rate $R_B = 60$ bits/sec.

B. Large Multi-use Building

In the second set of tests power distribution lines were used for transmission of the communication signal as well as for synchronization. The lines were located in a large multi-use building (the Electrical Engineering building) at the University of British Columbia in Vancouver, British Columbia, Canada.

Figure 7:
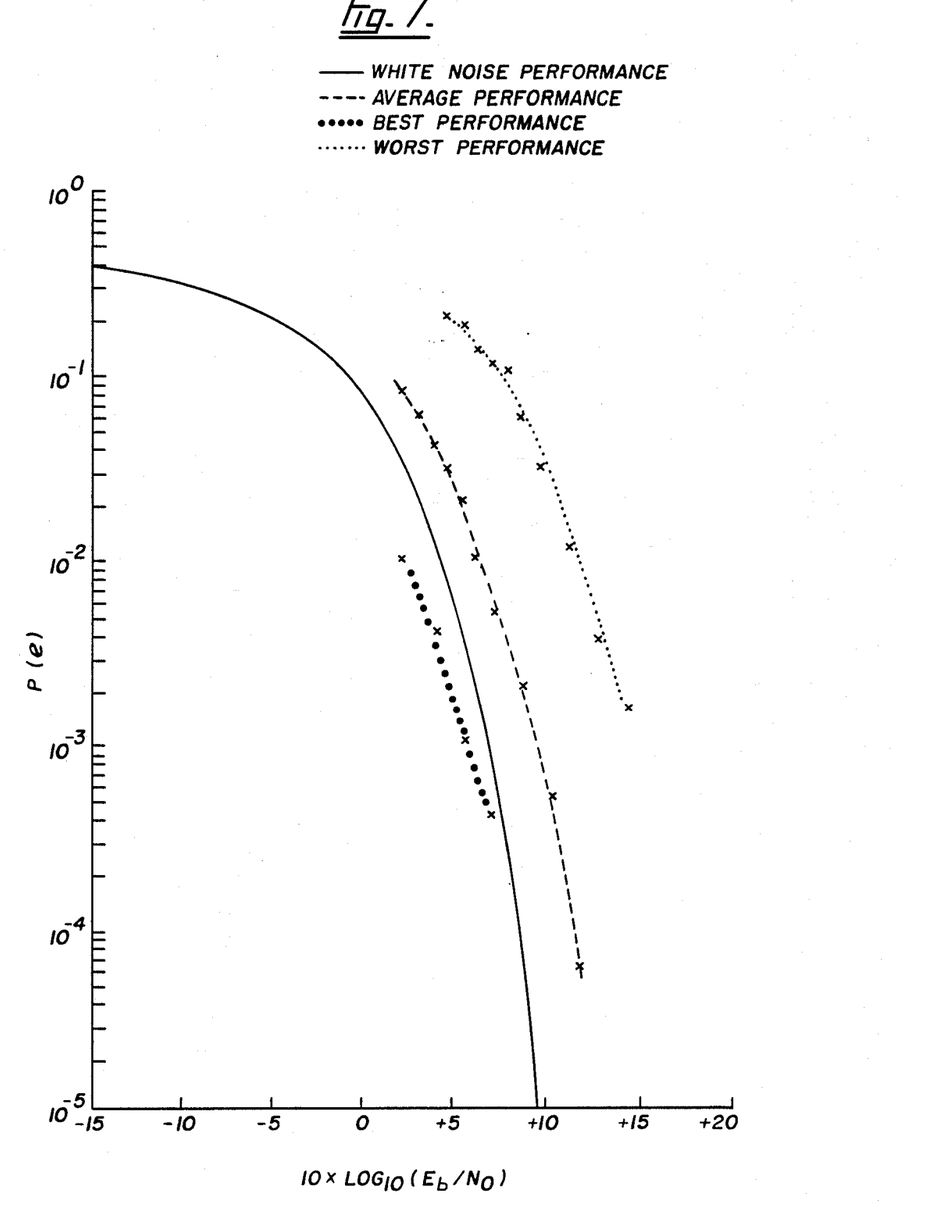
FIG. 7 is a graph similar to FIG. 6 wherein the transmitter and receiver were connected by means of 60 Hz power distribution lines in a large multi-use building.

The measurements were taken over a 30-hour period commencing on a Sunday running into the next day. During this period, the background noise level as measured at the receiver remained relatively constant. However during a two-hour period on Sunday afternoon many voltage transients occurred, presumably as a result of loads switching on and off. During this two-hour period, the measured bit-error probability increased by more than tenfold over its value measured at other times FIG. 7 shows the calculated white-noise values of p as well as those values measured during the best, worst, and average performance periods. All curves are seen to parallel the white noise curves; however the average values of p differ from both the best and worst values by a factor of ten or more.

C. Residential Apartment Building

The third set of measurements were taken over a 24-hour period on a Tuesday and Wednesday. Both the transmitter and receiver were located in one suite of a residential apartment building containing approximately 30 dwelling units. During the test period the background noise level varied over a 10 dB range. The highest noise level occurred at 11:00 p.m. while the lowest noise level occurred at 4:00 a.m.

Figure 8:
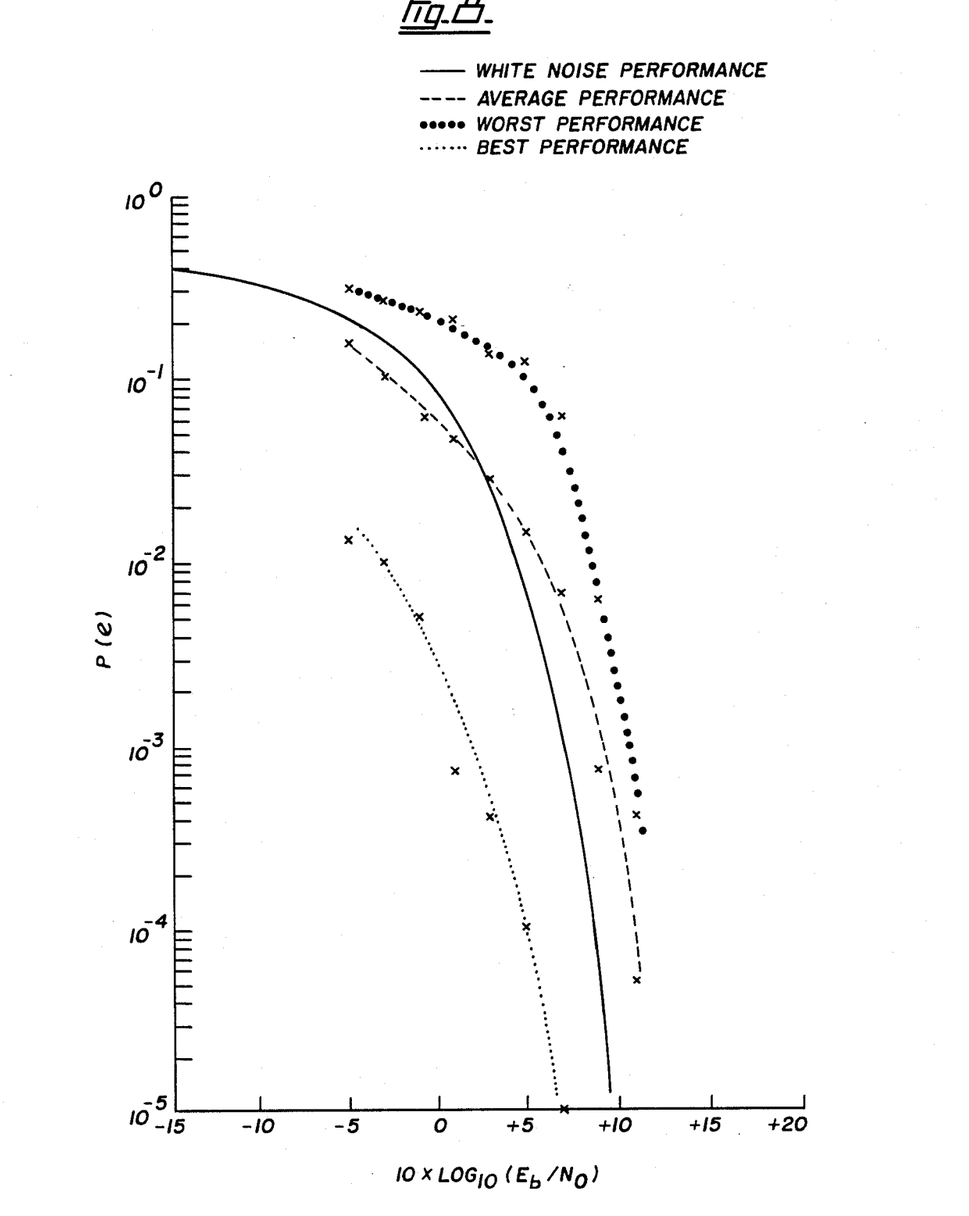
FIG. 8 is a graph similar to FIG. 6 wherein the transmitter and receiver were connected by means of 60 Hz power distribution lines in a residential apartment building.

FIG. 8 shows the measurement results. Again there is considerable variation in p, up to a factor of 1000 between the average and worst case and up to a factor of 5 between the average and best case.

The three test results indicate that the above modem performs properly on power line distribution circuits. Observations during the tests indicated that most of the errors resulted from noise impulses. These impulses distort the chip amplitudes which are subsequently integrated. Impulse noise occurs in other communication environments and is combatted by using impulse noise filters. Accordingly, addition of an impulse noise filter to the receiver would likely significantly improve performance.

It is seen in FIGS. 7 and 8 that bit-error rates vary widely over a 24-hour period because of wide variations in background noise levels. Performance was poorest in the evening from 6:00 p.m. to 11:00 p.m. when noise levels were highest and best from 3:00 a.m. to 6:00 a.m. when noise was at its lowest level. The difference betwen the best and worst performance varied over two orders of magnitude for constant SNR or, equivalently, over 5 dB in SNR for the same bit-error rate. Averaging of these variations as if the noise level were constant yields modem performance equivalent to white noise performance with 3 dB performance loss.

The results in FIGS. 7 and 8 indicate the requirement of $E_b/N_O = 12$ dB for a bit-error probability of $10^{-4}$. Using the peak noise levels observed during the tests implies a received signal power of 0.25 mwatt ($-6$ dBm). A typical transmitter could deliver 1 watt (30 dBm) which implies an allowable attenuation loss between transmitter and receiver of not more than 36 dB. Measurements made during the performance tests indicated a loss of 6 dB with both the transmitter and receiver on the same side of a distribution transformer, and a 16 dB loss when these were on opposite sides of the transformer. Thus, the unused power margin lies between 20 and 30 dB. Addition of capacitors to couple across the distribution transformer could increase the lower, 20 dB margin to lie between 20 and 30 dB. For a single user, the implication is that the value $p = 10^{-4}$ could be maintained with a bit rate increase from 60 bits/sec to at least 6 kbits/sec, and possibly to 60 kbits/sec if the carrier frequency were also increased.

At 60 bits/sec data rate, and with the current processing gain G, of 233, approximately 12 users could be active simultaneously at a bit-error probability of $10^{-4}$. Any increase in this data rate would have to be accompanied by a reduction in M, (the number of users) or increase in G or both. Increasing G requires a reduction in the zero crossing jitter. Such might be obtained by averaging the zero-crossing rate over many cycles could reduce the jitter considerably. For example a 2 second average would reduce the standard deviation of the jitter elevenfold, assuming statistical independence among zero-crossing jitter samples A corresponding increase in G could then occur and M could then increase by a factor of eleven to approximately 130 simultaneous users, all operating with 1-watt transmitters at 60 bits/second. The carrier frequency would also have to increase by a factor of 11 to 150 kHz, which may in fact be close to the upper limit at which the power distribution network is usable for pseudonoise communications in a localized region.

It will be appreciated of course, that when the transmitter and receiver are separated by long distances, that is substantially greater than about 300 meters, some form of delay compensation may be required to align transmitter and receiver code signals due to propagation delays of the A.C. and communication signals. Knowledge by the transmitter of the distance to the receiver could allow a fixed offset to be inserted into the transmitter in the case of receivers at a fixed distance. If the receivers were at various distances from the transmitter, some delay compensation at the receivers may be required. Such delay compensation could be implemented prior to a broadcast signal's transmission by means of a suitable communication protocol or by some other suitable prearranged means.

Although the modem as described is particularly useful for communication on power lines, it will be appreciated that it could be used on any line carrying an A.C. signal. In addition, although the various signals have been referred to throughout this application as being synchronized, this does not necessarily mean that they are in alignment. For example, when zero crossings of the A.C. signal are used to establish synchronization of the code and other signals, there could be a delay between the zero crossing of the A.C. signal and the zero crossings of the other signals. In such a case though, an equivalent delay must be present at the receiver to ensure alignment of the transmitter and receiver code signals, as well as alignment of their carrier and data bit signals when a coherent system is being used.

Various modifications could be made to the devices described above bearing in mind the following considerations. First, it will be evident that the data bit rate and the code bit rate can be varied, provided that the code bit rate is higher than the data bit rate (usually at least about 10 times higher). Another consideration is that most electric power generating stations transmit 3 phase power, which is eventually distributed to buildings by a centre tap distribution transformer. As a result, any one of 6 phase-separated power line voltages is possible at a randomly selected wall plug. To avoid phase ambiguities in such typical distribution systems, the code should preferably be designed to repeat 6n times within each A.C. cycle, where n is any positive integer Provided there is adequate data signal power coupled between the phases, transmissions clocked on any one of the 6 A.C. signals can be decoded by receivers clocked on any of the six signals. In addition, to avoid polarity ambiguity between the transmitter and receiver, which would occur on most conventional A.C. power distribution systems the data could be differentially encoded as described by Bylanski and Ingram in the text *Digital Transmission Systems* 1976, Chapters 6 and 7.

Other considerations in modem design implementation utilizing the above concept, include the effect of phase noise (jitter) in the A.C. signal. Jitter will affect the synchronization of the transmitter and receiver code signals, with the affects becoming more serious on a coherent system with higher carrier frequencies. In such cases, transmission of some carrier signal power for processing by standard known carrier recovery circuits, may be required. In that event, the A.C. signal would continue to be used to synchronize the code and bit signals. In such case, it can be shown that the optimum value of the code rate is given by:

$$R_{CO} = \tfrac{1}{2} J$$

where J is the jitter standard deviation, in seconds. For a typical power line J may equal approximately 10 microseconds, in which case the optimum code rate would be approximately 50 k bits/sec, with the number of code chips during one 60 Hz. cycle for example being N equals approximately 830. When the carrier is a square wave of frequency equal to the code rate and synchronized from the A.C. signal, it can be shown that $$R_{CO} = \tfrac{1}{2} J.$$

The foregoing simplified analysis is based on the assumption of Gaussian noise to indicate that zero crossing jitter imposes an upper limit on the practically usable code rate. However, power line noise is known to be non-Gaussian, so in practice one would do some experimentation to determine the best code rate.

Further considerations include the frequency band of operation, for which a compromise between increased attenuation at high frequencies and increased noise levels at low frequencies is made when using electric power distribution circuits. Typically, the band between 10 and 100 kHz is usually used. Furthermore, a circuit analysis shows in order to maximize the signal to noise ratio, the impedance of a transmitter or receiver constructed in accordance with the present invention, should be as low as possible. It will also be appreciated that of course many other circuits could be constructed which will produce the same result achieved by the circuits previously described. One particular possible modification includes the provision of tracking circuitry to obtain better alignment of the received code signal with that from the transmitter.

Modifications to the circuits in FIGS. 2 and 3 are readily accomplished to allow for transmission and reception of other information signals including analog signals which do not require synchronization. The data spreader/BPSK modulator circuit in FIG. 2 would be replaced by a signal spreader/modulator to multiply the code, carrier and information signals. Such a circuit would of course also be suitable for use with a data signal. Exclusive-NOR multiplication of the code and carrier in FIG. 2, followed by multiplication of the resulting signal and information signal using a switching modulator would yield desired signal (at the point shown by $M_{DATA}$) which would then be amplified and transmitted. In FIG. 3 $R_{DES}$ would be passe through a filter whose output would constitute the received information signal. If the circuit in FIG. 3 included both the data detector and filter, the circuit together with the common elements in FIG. 4 would be able to receive either the data signal or other information signal, which ever was transmitted, at the appropriate output signal points.

The signal-to-noise ratio output from the filter is again given (4) provided $R_B$ is replaced in the above equations by $2W_m$ where $W_m$ is the information signal bandwidth. In such case $$SNR_o = P/N_o W_m \qquad (9)$$

and $$G = R_c / 2W_m \qquad (10)$$

The maximum information signal bandwidth which can be accommodated would depend on the minimum acceptable value of $SNR_o$, and other parameters in accordance with the above equations.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

We claim:

1. A modem for communication of an input signal over a line carrying an A.C. signal, said modem comprising a transmitter and a receiver, said transmitter comprising:
    (a) first pseudo random noise code generator means for generating, in response to a first synchronization signal, a pseudo random noise code signal having a selected code chip rate;
    (b) first synchronization means for producing said first synchronization signal on a zero amplitude crossing of said A.C. signal;
    (c) first signal multiplier means connected to the output of said first pseudo random noise code generator means, for multiplying said pseudo random noise code and input signals to produce a transmission signal; and,
    (d) coupling means for coupling said transmission signal to said line;

said receiver comprising:
  (e) decoupling means for decoupling said transmission signal from said line;
  (f) second pseudo random noise code generator means for generating said pseudo random noise code signal in response to a second synchronization signal;
  (g) second synchronization means for producing said second synchronization signal on a zero amplitude crossing of said A.C. signal;
  (h) second signal multiplier means connected to the output of said second pseudo random noise code generator means, for multiplying said pseudo random noise code and transmission signals to produce a replica of said input signal; and
  (i) signal averaging means for producing an output signal representative of the zero amplitude crossings of said A.C. signal average over a plurality of cycles of said A.C. signal and wherein said second synchronization means produces said second synchronization signal upon production of said output signal.

2. A modem as defined in claim 1 wherein:
  (a) said transmitter further comprises first carrier signal generator means for generating a carrier signal;
  (b) said first signal multiplier means is for further multiplying said code and input signals with said carrier signal;
  (c) said receiver further comprises second carrier signal generator means for generating said carrier signal; and,
  (d) said second signal multiplier means is for further multiplying said code and transmission signals with said carrier signal.

3. A modem as defined in claim 1 or 2, wherein said A.C. signal has multiple phases and wherein said first and second synchronization means produce said first and second synchronization signals respectively on each zero amplitude crossing of each of said phases.

4. A modem as defined in claim 3, wherein said code chip rate is a positive integer multiple of twice the number of phases comprising said A.C. signal.

5. A modem as defined in claim 4, wherein the frequency of said carrier signal equals said code chip rate.

6. A modem as defined in claim 4, wherein the frequency of said carrier signal equals said code chip rate.

7. A modem as defined in claim 2, wherein the frequency of said carrier signal equals said code chip rate.

8. A modem as defined in claim 2, wherein said first and second carrier signal generators produce said first and second carrier signals in response to said first and second synchronization signals respectively.

9. A modem as defined in claim 1 or 2, wherein said code chip rate is positive integer multiple of the frequency of said A.C. signal.

10. A modem as defined in claim 9, wherein the frequency of said carrier signal equals said code chip rate.

11. A modem as defined in claim 1, wherein the frequency of said carrier signal equals said code chip rate.

12. A modem as defined in claim 1, wherein said first and second carrier signal generators produce said first and second carrier signals in response to said first and second synchronization signals respectively.

13. A method of communicating an input signal over a line carrying an A.C. signal, said method comprising the steps of:
  (a) producing a pseudo random noise code having a selected code chip rate upon the occurrence of a zero amplitude crossing of said A.C. signal;
  (b) modulating said code with said input signal to produce a transmission signal;
  (c) coupling said transmission signal to said line;
  (d) decoupling said transmission signal from said line;
  (e) reproducing said pseudo random noise code upon the occurrence of a further zero amplitude crossing of said A.C. signal;
  (f) demodulating said code and transmission signals to produce a replica of said input signal;
  (g) prior to said coupling step:
    (i) producing a carrier signal in synchronization with a zero amplitude crossing of said A.C. signal; and,
    (ii) further modulating said transmission signal with said carrier signal; and
  (h) prior to said demodulating step;
    (i) reproducing said carrier signal in synchronization with zero amplitude crossing of said A.C. signal; and,
    (ii) demodulating said carrier and transmission signals to separate said carrier from said transmission signal.

14. A method as defined in claim 13, further comprising producing and reproducing said pseudo random noise code on each zero amplitude crossing of each phase of said A.C. signal.

15. A method as defined in claim 14, further comprising, before said code reproducing step, averaging the zero amplitude crossings of said A.C. signal over a plurality of cycles of said A.C. signal and varying said code reproducing step to reproduce said code in synchronization with said averaged zero amplitude crossing.

16. A method as defined in claim 13, further comprising producing and reproducing said pseudo random noise code at a code chip rate which is a positive integer multiple of the frequency of said A.C. signal.

17. A method as defined in claim 16, further comprising producing and reproducing said carrier signal at a frequency equal to the code chip rate of said pseudo random noise code.

18. A method as defined in claim 16, further comprising, before said code reproducing step, averaging the zero amplitude crossings of said A.C. signal over a plurality of cycles of said A.C. signal and varying said code reproducing step to reproduce said code in synchronization with said average zero amplitude crossing.

19. A method as defined in claim 13, further comprising producing and reproducing said carrier signal at a frequency equal to the code chip rate of said pseudo random noise code.

20. A method as defined in claim 13, further comprising, before said code reproducing step, averaging the zero amplitude crossings of said A.C. signal over a plurality of cycles of said A.C. signal and varying said code reproducing step to reproduce said code in synchronization with said averaged zero amplitude crossing.

21. A method of communicating an input signal over a line carrying an A.C. signal, said method comprising the steps of:
  (a) producing a pseudo random noise code having a selected code chip rate upon the occurrence of a zero amplitude crossing of said A.C. signal;

(b) modulating said code with said input signal to produce a transmission signal;
(c) coupling said transmission signal to said line;
(d) decoupling said transmission signal from said line;
(e) reproducing said pseudo random noise code upon the occurrence of a further zero amplitude crossing of said A.C. signal, and before said code reproducing step, averaging the zero amplitude crossing of said A.C. signal over a plurality of cycles of said A.C. signal and varying said code reproducing step to reproduce said code in synchronization with said averaged zero amplitude crossing; and,
(f) demodulating said code and transmission signals to produce a replica of said input signal.

22. A method of communicating an input signal over a line carrying an A.C. signal, said method comprising the steps of:
(a) producing a pseudo random noise code having a selected code chip rate upon the occurrence of a zero amplitude crossing of said A.C. signal;
(b) modulating said code with said input signal to produce a transmission signal;
(c) coupling said transmission signal to said line;
(d) decoupling said transmission signal from said line;
(e) reproducing said pseudo random noise code on each zero amplitude crossing of each phase of said A.C. signal and, before said code reproducing step, averaging the zero amplitude crossing of said A.C. signal over a plurality of cycles of said A.C. signal and varying said code reproducing step to reproduce said code in synchronization with said averaged zero amplitude crossing; and,
(f) demodulating said code and transmission signals to produce a replica of said input signal.

23. A method of communicating an input signal over a line carrying an A.C. signal, said method comprising the steps of:
(a) producing a pseudo random noise code having a selected code chip rate upon the occurrence of a zero amplitude crossing of said A.C. signal;
(b) modulating said code with said input signal to produce a transmission signal;
(c) coupling said transmission signal to said line;
(d) decoupling said transmission signal from said line;
(e) reproducing said pseudo random noise code upon the occurrence of a further zero amplitude crossing of said A.C. signal and at a code chip rate which is a positive integer multiple of the frequency of said A.C. signal, before said code reproducing step, averaging the zero amplitude crossings of said A.C. signal over a plurality of cycles of said A.C. signal and varying said code reproducing step to reproduce said code in synchronization with said averaged zero amplitude crossing, and
(f) demodulating said code and transmission signals to produce a replica of said input signal.

* * * * *

UNITED STATES PATENT AND TRADEMARK OFFICE
CERTIFICATE OF CORRECTION

PATENT NO. : 4,835,517
DATED : May 30, 1989
INVENTOR(S) : P.K. van der Gracht; R.W. Donaldson It is certified that error appears in the above-identified patent and that said Letters Patent is hereby corrected as shown below:

On the Front Page:

Title, change "PSEUDO NOISE" to -- PSEUDONOISE --, and "A.C." to -- AC --.
Abstract, lines 2,5,7,9,12,14, change "A.C." to -- AC --.

In the Specification:

Column 1, lines 3,7, change "A.C." to -- AC --.
Column 1, lines 43,45,50, change "pseudo random" to -- pseudorandom --.

Column 2, lines 24,25,32,34,36,41,47,51,57,58,62,65,68, change "A.C." to -- AC --.
Column 2, lines 29 and 31 change "pseudo random to -- pseudorandom--.
Column 3, lines 4,6, change "usefully" to -- usually --.
Column 3, lines 9,14,17,35,65,67, change "A.C." to -- AC --.
Column 3, line 33, change "wave forms" to -- waveforms --.

Column 4, lines 1,11,13,14,50, change "A.C." to -- AC --.
Column 4, line 24, change "volts, d.c.," to -- volts DC --.
Column 4, line 37, change "pseudo random" to -- pseudorandom --.

Column 5, line 4, change "constructed" to -- construction --.
Column 5, line 19, change "R$_{CODE}$ X R$_{CAR}$" to -- $\underline{R_{CODE} \, X \, R_{CAR}}$ --.
Column 5, line 42, change "A.C." to -- AC --.
Column 5, line 54, change "volt meter" to -- voltmeter --.

UNITED STATES PATENT AND TRADEMARK OFFICE
CERTIFICATE OF CORRECTION

PATENT NO. : 4,835,517

DATED : May 30, 1989

INVENTOR(S) : P.K. van der Gracht; R.W. Donaldson

It is certified that error appears in the above-identified patent and that said Letters Patent is hereby corrected as shown below:

Column 7, line 5, change "$E_b$per" to -- $E_b$ per --.

Column 7, line 28, after "times" insert a period.

Column 8, line 29, after "cycles" insert -- which --.

Column 8, lines 47,60,64,66, change "A.C." to -- AC -- (all occurrences).

Column 9, lines 18,21,25,31,37,50, change "A.C." to -- AC -- (all occurrences).

Column 9, line 19, after "integer" insert a period

Column 10, line 20, change "passe" to -- passed --.

In the Claims

Column 10, lines 52,61, change "A.C." to -- AC -- (both occurrences).

Column 11, lines 10,18,19,67,38,44,57, change "A.C." to -- AC -- (all occurrences).

Column 12, lines 3,10,15,21,30,41,58,59,64,68,33,34,48,49, change "A.C." to -- AC --.

Column 13, lines 7,9,10,16,20,27,28,29, change "A.C." to -- AC --.

UNITED STATES PATENT AND TRADEMARK OFFICE
CERTIFICATE OF CORRECTION

PATENT NO. : 4,835,517

DATED : May 30, 1989

INVENTOR(S) : P.K. van der Gracht; R.W. Donaldson

It is certified that error appears in the above-identified patent and that said Letters Patent is hereby corrected as shown below:

Column 14, lines 8,11,19,21,22,23, change "A.C." to -- AC --.

Signed and Sealed this

Twenty-fifth Day of September, 1990

Attest:

HARRY F. MANBECK, JR.

*Attesting Officer*      *Commissioner of Patents and Trademarks*